United States Patent Office 2,962,860
Patented Dec. 6, 1960

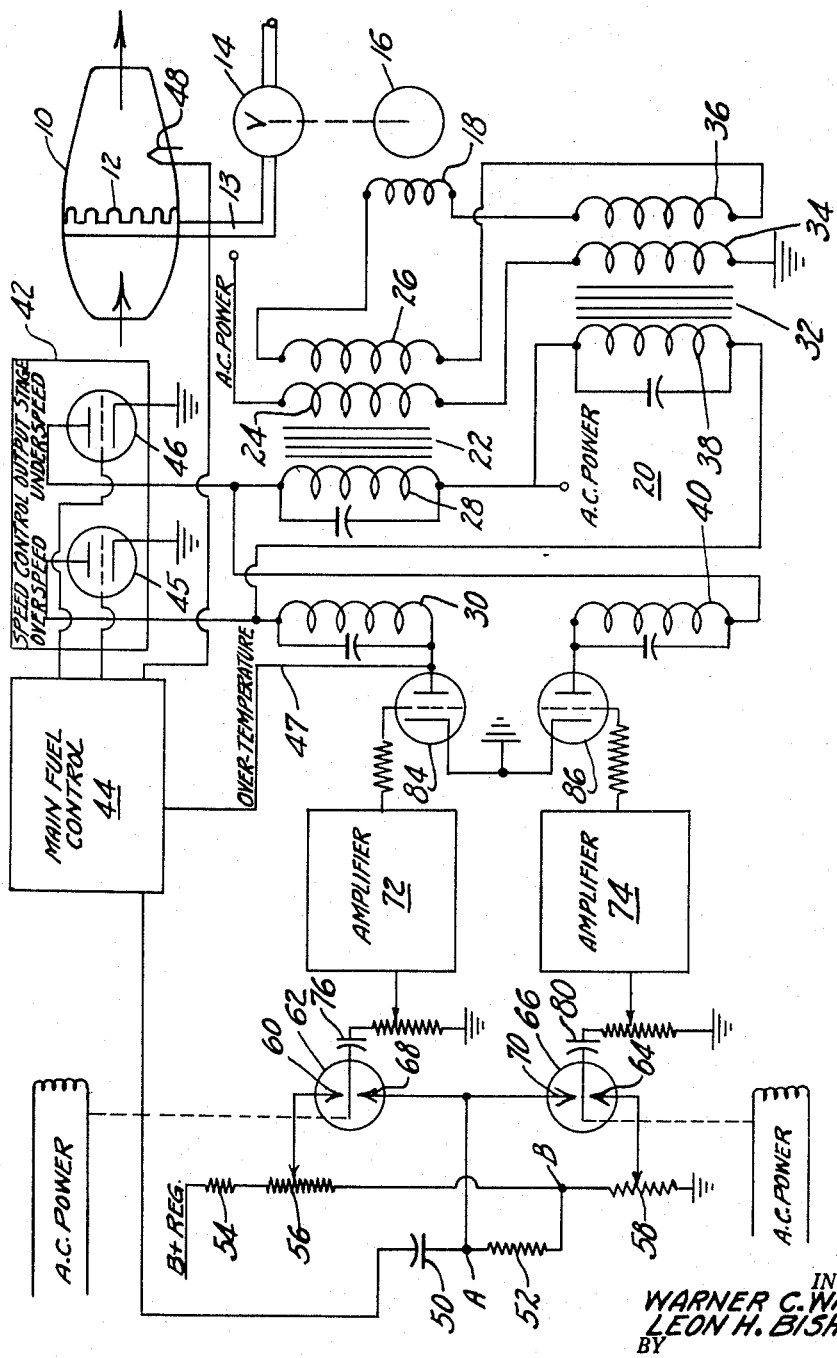

2,962,860

TEMPERATURE RATE RESPONSIVE FUEL CONTROL FOR A GAS TURBINE ENGINE

Warner C. Wintrode and Leon H. Bishop, South Bend, Ind., assignors to The Bendix Corporation, a corporation of Delaware Filed Dec. 21, 1955, Ser. No. 554,547

8 Claims. (Cl. 60—39.28)

This invention relates to control systems and more particularly to a system for controlling the flow of fuel supplied to gas turbine engines and the like.

It has long been known that gas turbine engines have definite limitations as to the operating temperatures which they can withstand. Steady state operating temperatures are usually much lower than the temperatures permitted during acceleration or periods of peak output. Engines have improved greatly, however, in their ability to withstand higher temperatures and fuel control systems have been devolped to the point where they can supply fuel in such manner as to accelerate and decelerate an engine over its maximum temperature range in such a short time that the engine may be subjected to thermal shock. Temperature changes of the order of 1000° F. or more per second impose tremendous strains on the metal in turbine blades, for example, and may result in failure of the parts so exposed. It is, therefore, an object of the present invention to provide a system for controlling fuel flow in such manner that operating temperature changes do not exceed a predetermined rate.

It is another object to provide a temperature rate limiter for a fuel control in which the rate of change is easily adjusted to allow for different engine characteristics.

It is a further object to provide a temperature rate limiter which is adaptable for use with an electrical main control system having a saturable reactor output section.

It is a further object to provide a control system capable of limiting the rate of change of any of a number of operating conditions the magnitudes of which may be represented in terms of electrical voltage.

Other objects and advantages will become apparent from the following description and the accompanying drawing in which:

The single figure is a schematic drawing of our limiting system shown in conjunction with a gas turbine engine and main fuel control.

Referring to the drawing, a gas turbine engine is shown generally at numeral 10. Fuel is supplied under pressure to said engine from a source (not shown) by means of a manifold 12 and a conduit 13 the effective area of said conduit being controlled by a valve 14. Valve 14 is moved through the action of a motor 16. The direction of rotation of said motor is dependent upon the direction of current flowing through a control winding 18. The direction of the control current is established by means of a saturable reactor output system shown generally at 20 having a core member 22 upon which is wound an alternating current power winding 24, an output winding 26, and two direct current signal windings 28 and 30; and a core member 32 having a power winding 34, an output winding 36, and direct current signal windings 38 and 40. Current flowing in output winding 36 tends to cause the valve motor 16 to rotate in a direction opening valve 14 and current flow in winding 26 tends to rotate motor 16 in a direction tending to close valve 14. Current flowing in one or the other of the output windings is controlled by means of the direct current signal windings. The signal windings are connected to the output stage of the speed control portion 42 of the main fuel control 44 in such manner that an over-speed signal emanating from a tube 45 will flow through winding 38 and an under-speed signal emanating from a tube 46 will flow through winding 28. In each case the signal current tends to saturate one core thereby causing the voltage drop across one output winding to exceed the other. Inasmuch as the output windings 26 and 36 are connected in voltage bucking relationship, the resultant voltage is impressed upon motor control winding 18. It will be noted that a wire 47 carries over-temperature signals to control windings 30 and 38 in the same relation as over-speed signals are carried. Either over-speed or over-temperature conditions sensed in the engine call for reduced fuel flow; therefore, the valve motor should move in the same direction upon the occurrence of either condition. The system heretofore described is set forth in greater detail in Wintrode application Ser. No. 402,976 (common assignee).

The temperature rate control which is the subject of the present invention is coordinated with the above system in such manner as to prevent the occurrence of rates of change of temperature in excess of a predetermined value irrespective of whether conditions are causing temperatures to increase or decrease. A temperature sensitive device 48, which may be a thermocouple, is located in turbine 10 in such manner as to reflect operating temperatures. This temperature signal is supplied to the main fuel control unit 44 and, after amplification, to the temperature rate circuit, feeding into a resistance-capacitance circuit consisting of a capacitor 50 and a resistor 52. Because of the action of capacitor 50, the voltage drop across resistor 52 is directly proportional to rate of change of temperature as sensed by thermocouple 48. The polarity of the voltage developed across resistor 52 is dependent upon whether the temperature change reflected is in an increasing or a decreasing direction. The reference voltage is supplied from a regulated source of B plus voltage through a resistor 54 to the temperature rate increase reference potentiometer 56 and the temperature rate decrease reference potentiometer 58. It will be observed that the slider on potentiometer 56 is connected with a stationary contact 60 of a chopper 62 and potentiometer 58 is connected with a stationary contact 64 of a chopper 66. A point A between capacitor 50 and resistor 52 is connected to contact 68 of chopper 62 and to contact 70 of chopper 66. The movable contacts of said choppers are each driven by a source of alternating current, which may be 400 cycle, so that each chopper effectively compares a reference signal with the temperature rate signal. Chopper 62 compares the voltage developed between point B and the portion of potentiometer 56 shown below the slider, with the temperature rate signal developed between points A and B. During a period of increasing temperatures the rate voltage is positive and the reference voltage is positive with respect to point B. During a period of temperature decreases, the voltage developed across resistor 52 is negative with respect to point B as is the reference voltage on contact 64 of chopper 66. Each chopper will produce an output signal reflecting the comparison between its reference and the instantaneous value of the temperature rate signal. This output is supplied to a pair of amplifiers 72 and 74. When the reference and the rate signal on either chopper are exactly equal, the output of the chopper is equivalent to a smooth direct current and is blocked by means of capacitor 76 in the output of chopper 62 and capacitor 80 in the output of chopper 66. Any other condition will result in an alternating current input which is fed into amplifiers 72 and 74. These amplifiers are entirely conventional in design.

The outputs of amplifiers 72 and 74 are supplied to the grids of a pair of tubes 84 and 86, respectively. These tubes, in addition to providing a stage of amplification, also provide a means for discriminating against the undesired rate signal which is amplified through one or the other of the amplifiers. It will be observed that the plate voltage supply for each of these tubes is connected through a pair of reactor control windings to an alternating current source. This source is the same as that supplying the choppers 62 and 66 or must be of the same frequency and phase relationship. The input signals to tubes 84 and 86 are so phased in relation to the plate voltage that conduction takes place only upon the occurrence of a temperature rate of change in excess of that requested on either of potentiometers 56 or 58. Specifically, the only signals emanating from chopper 62 which would be of proper polarity to be amplified through tube 84 are those indicative of a rate of temperature increase greater than that requested by means of potentiometer 56 and the only signals emanating from chopper 66 which are amplified through tube 86 are those indicative of a rate of temperature decrease greater than that requested on potentiometer 58.

When current flows in the anode circuit of tube 84, it is also caused to flow through signal windings 30 and 38 which are connected in such manner that said current effectively increases the tendency to saturate one core and reduces the tendency to saturate the other core thus tending to cause the valve 14 to be moved in a closing direction as set forth above. What actually happens is that, during an acceleration when the speed is under the requested value and operating temperature is below the maximum allowable, the valve is moved into a wide open position because of the signal on under-speed control winding 28. This causes a very rapid increase in operating temperature, sensed by thermo-couple 48. This increase very soon results in an excessive temperature rate of increase. A signal then appears on windings 30 and 38 which acts either to move valve 14 in a closing direction or to reduce its rate of movement in an opening direction. A signal appearing on the grid of tube 86 which is of proper phase to cause conduction acts in a manner entirely analogous to that set forth above to cause the valve to move in an opening direction or to reduce its rate of movement in a closing direction.

Operation may be best understood by considering a typical acceleration and deceleration of the engine from idle to maximum power output and back to idle. To initiate an acceleration, the operator of the engine supplies a request signal to the main control 44 which results in the creation of control signal indicating an under-speed condition. This causes current to flow in the channel including vacuum tube 46 and control winding 28 and causing motor 16 to move valve 14 in an opening direction. As the valve opens, operating temperature and temperature rate each increase very rapidly until the temperature rate exceeds the rate of change permitted by potentiometer 56. The output of chopper 62 and, hence, the input to the grid of tube 84 is then of such phase with respect to the voltage on the anode of tube 84 that a current is caused to flow which energizes windings 30 and 38 thus limiting the rate at which fuel flow is permitted to increase. This limitation remains effective until the maximum allowable operating temperature is reached at which time a temperature limiting signal from main control 44 is impressed upon windings 30 and 38, stabilizing operation at maximum temperature, thereby reducing the temperature rate signal to a value below the reference. The engine will then accelerate at the established temperature value until maximum speed is reached, at which time the over-speed circuit including vacuum tube 45 and winding 38 acts to stop any further increase in speed. The engine is then normally stabilized at the maximum speed with temperature dropping to a value sufficient to support steady state operation. It is possible that the speed request may be drastically reduced either from a stabilized maximum speed or from a maximum temperature acceleration, in which case the over-speed circuit will immediately conduct, causing current to flow in winding 38 which, in turn, will cause the valve 14 to be moved in a closing direction. This rapid reduction in fuel flow causes temperatures to be reduced at a rate in excess of that requested on potentiometer 58, thereby causing an output from chopper 66 of such phase relationship that the amplified signal applied to vacuum tube 86 is in phase with the anode voltage on said tube. Current, therefore, flows through windings 28 and 40, thus reducing the effectiveness of the over-speed signal on winding 38 and thereby reducing the rate at which fuel flow is diminished.

Although only one embodiment is shown herein, changes may be made to suit the requirements of a particular installation without departing from the scope of the invention. While our invention is shown herein in connection with a means for limiting the rate of change of temperature, it will be obvious to those skilled in the art that other conditions which may be represented as voltage, may be controlled in a manner similar to that set forth above.

We claim:

1. In a system for controlling the flow of fuel to a gas turbine engine, a fuel valve, a reversible electric motor for controlling the position of said valve and means for controlling the movement of said motor including a saturable reactor having a first set of control windings which, when energized, are effective to cause said motor to move in one direction, and a second set of control windings effective to cause said motor to move in the other direction, means responsive to the rotational speed of said engine for causing one or the other of said sets of windings to become energized upon the occurrence of a speed condition varying from that requested, means responsive to a temperature varying substantially with engine combustion temperature for creating a temperature voltage causing one of said set of control windings to become energized upon the occurrence of an engine operating temperature in excess of that requested: a temperature rate limiting system comprising a network containing a resistor and a capacitor to which said temperature voltage is applied the voltage developed across said resistor being proportional to time rate of change of temperature, a source of regulated direct current voltage and a voltage dividing network containing a first potentiometer for establishing a reference voltage reflecting a selected time rate of increase of temperature and a second potentiometer for establishing a reference voltage reflecting a selected time rate of decrease of temperature, a first chopper connected to said first potentiometer, a second chopper connected to said second potentiometer, means supplying said temperature rate of change voltage to each of said choppers in such manner that each chopper compares the temperature rate voltage with one of said reference voltages and produces an output voltage varying in phase and magnitude depending upon the direction and magnitude, respectively, of temperature rate error, means for amplifying each of said output voltages including a stage of phase-sensitive amplification which acts to block all temperature rate error voltages except those representative of temperature rates of change greater than those requested on said potentiometers, and means for conducting the output of said amplification means to said first set of control windings when said rate error voltage is representative of a temperature rate of increase in excess of that requested on said first potentiometer, and to said second set of control windings when said rate error voltage is representative of a temperature rate of decrease greater than that requested on said second potentiometer.

2. A system for controlling the flow of fuel to a gas turbine engine or the like comprising a fuel conduit, a valve for varying the effective area of said conduit, electro-responsive means for controlling the position of said valve, means for energizing said electro-responsive means including a saturable reactor having a first set of control windings which, when energized, tend to cause said valve to be moved in a closing direction, and a second set of control windings which tend to cause said valve to be moved in an opening direction, means responsive to the rotational speed of said engine for energizing one or the other of said sets of control windings, means responsive to a temperature varying substantially with engine combustion temperature for creating a temperature signal to be impressed on said first set of control windings, and a temperature rate limiter including means utilizing said temperature signal to produce a signal varying with time rate of change of temperature, means producing a rate of temperature increase reference signal and means producing a rate of temperature decrease reference signal, means comparing said temperature rate signal with each of said reference signals thereby producing temperature rate error signals, amplification means for amplifying said error signals including a stage of phase-sensitive amplification for blocking all rate error signals except those indicative of rates of change greater than those established by said reference signals, and means conducting any rate error signal passed by said phase-sensitive stage to said first set of control windings if said signal is representative of an excessive temperature rate of increase and to said second set of control windings if said signal is representative of an excessive temperature rate of decrease.

3. A system for limiting the time rate of change of an operating condition of a gas turbine engine or the like comprising means for controlling the flow of fuel to said engine, electro-responsive means effective to vary said controlling means, means producing an electrical signal varying with changes in the sensed value of said operating condition, a resistance-capacitance circuit for converting said signal to a second signal representative of time rate of change of said operating condition, a voltage dividing network for producing a rate of decrease reference signal and a rate of increase reference signal, and means comparing said time rate of change signal with said reference signals to produce rate error signals, amplification means for said rate error signals including phase-sensitive means for blocking all rate error signals except those representative of rates of change greater than those established by said reference signals, and means utilizing those error signals passed by said phase-sensitive means to limit the movement of said electro-responsive means.

4. A system for limiting the time rate of change of an operating condition of a gas turbine engine or the like comprising means for controlling the flow of fuel to said engine, electro-responsive means effective to vary said controlling means, means producing an electrical signal varying with changes in the sensed value of said operating condition, means for converting said signal to a second signal representative of time rate of change of said operating condition, a voltage dividing network for producing a rate of decrease reference signal and a rate of increase reference signal, and means comparing said rate of change signal with said reference signals to produce rate error signals, amplification means for said rate error signals including phase-sensitive means for blocking all rate error signals except those representative of rates of change greater than those established by said reference signals, and means utilizing those error signals passed by said phase-sensitive means to limit the movement of said electro-responsive means.

5. A system for limiting the time rate of change of operating temperature of an engine comprising a conduit for delivering fuel to said engine, a valve for varying the effective area of said conduit, electro-responsive means for controlling the position of said valve, temperature sensitive means for producing a voltage proportional to operating temperature of said engine, a resistance-capacitance network utilizing said temperature signal to produce a signal proportional to time rate of change of temperature, a voltage dividing network for producing a rate of temperature increase reference signal and a rate of temperature decrease reference signal, means producing temperature rate error signals by comparing said rate signal with said reference signals, means for amplifying said temperature rate error signals including a stage of phase-sensitive amplification for blocking all error signals except those indicative of temperature rates of change greater than those established by said reference signals, and means utilizing those error signals passed by said phase-sensitive stage to limit the movement of said electro-responsive means.

6. A system for limiting the time rate of change of operating temperature of an engine comprising a conduit for delivering fuel to said engine, means including electro-responsive means for controlling the amount of fuel flowing through said conduit, temperature sensitive means for producing a voltage proportional to the operating temperature of said engine, a resistance-capacitance network utilizing said temperature signal to produce a signal proportional to time rate of change of temperature, a voltage dividing network for producing a rate of temperature increase reference signal and a rate of temperature decrease reference signal, means producing temperature rate error signals by comparing said rate signal with said reference signals, means for amplifying said temperature rate error signals including a stage of phase-sensitive amplification for blocking all error signals except those indicative of temperature rates of change greater than those established by said reference signals, and means utilizing those error signals passed by said phase-sensitive stage to limit the movement of said electro-responsive means.

7. A system for limiting the time rate of change of operating temperature of an engine during transient operating conditions comprising a conduit for delivering fuel to said engine, means for controlling the amount of fuel flowing through said conduit, electro-responsive means for controlling said means, temperature sensitive means for producing a voltage proportional to operating temperature of said engine, a resistance-capacitance network utilizing said temperature signal to produce a signal proportional to time rate of change of temperature, a voltage dividing network for producing a rate of temperature change reference signal, means producing a temperature rate error signal by comparing said rate signal with said reference signal, means for amplifying said temperature rate error signal including a stage of phase-sensitive amplification for blocking all error signals except those indicative of temperature rates of change greater than that established by said reference signal, and means utilizing any error signal passed by said phase-sensitive stage to limit the movement of said electro-responsive means.

8. A system for limiting the time rate of change of operating temperature of an engine during transient operating conditions comprising a conduit for delivering fuel to said engine, means including electro-responsive means for controlling the amount of fuel flowing through said conduit, temperature sensitive means for producing a voltage proportional to operating temperature of said engine, means utilizing said temperature signal to produce a signal proportional to time rate of change of temperature, a voltage dividing network for producing a rate of temperature change reference signal, means producing a temperature rate error signal by comparing said rate signal with said reference signal, means for amplifying said temperature rate error signal including a stage of phase-sensitive amplification for blocking all error signals except those indicative of temperature rates of change greater than those established by said reference signal, and means utilizing any error signal passed by said phase-sensitive stage to limit the movement of said electro-responsive means.

References Cited in the file of this patent

UNITED STATES PATENTS

| | | |
|---|---|---|
| 2,450,907 | Newton et al. | Oct. 12, 1948 |
| 2,662,372 | Offner | Dec. 15, 1953 |
| 2,697,908 | Offner | Dec. 28, 1954 |
| 2,705,864 | Peters | Apr. 12, 1955 |
| 2,720,751 | Kunz | Oct. 18, 1955 |
| 2,766,584 | Stockinger | Oct. 16, 1956 |
| 2,776,536 | Chudyk | Jan. 8, 1957 |
| 2,790,120 | Ducoff | Apr. 23, 1957 |

FOREIGN PATENTS

| | | |
|---|---|---|
| 728,442 | Great Britain | Apr. 20, 1955 |